Aug. 15, 1933.    J. M. NICKELSEN    1,922,600
SHOCK ABSORBER
Filed Jan. 26, 1931    2 Sheets-Sheet 1

INVENTOR
John M. Nickelsen

ATTORNEYS

Aug. 15, 1933.   J. M. NICKELSEN   1,922,600
SHOCK ABSORBER
Filed Jan. 26, 1931   2 Sheets-Sheet 2

INVENTOR
John M. Nickelsen
BY
Whittemore Hulbert Whittemore & Belknap
ATTORNEYS

Patented Aug. 15, 1933

1,922,600

UNITED STATES PATENT OFFICE 1,922,600

SHOCK ABSORBER

John M. Nickelsen, Ann Arbor, Mich., assignor to Monroe Auto Equipment Company, Monroe, Mich., a Corporation of Michigan Application January 26, 1931. Serial No. 511,395

6 Claims. (Cl. 267—9)

This invention relates to shock absorbers and more especially to a two-way shock absorber or friction control for motor vehicles and the like.

One of the principal objects of this invention is to provide a device of this character constructed to provide variable resistance from the center or point of rest to each end of travel of the device.

Another object of the invention is to provide a friction control of this character in which the resistance set up is negligible when the vehicle is traveling over a smooth surface and becomes increasingly great in proportion to the movements of the car body resulting from the travel of the vehicle over rough surfaces.

Another object of this invention is to provide a device of this character having means for adjusting the degree of resistance so as to give varying control throughout the operating cycle of the device.

Another object of the invention is to provide a friction control device having means for automatically compensating for wear of the parts thereof.

Still another object of this invention is to provide a device of this kind in which the friction elements operate in oil or grease thus providing a lubricated friction control.

The several objects, advantages and novel details of construction of the invention will be made more apparent as this description proceeds, especially when considered in connection with the accompanying drawings, wherein Figure 1 is an elevational view of a friction control device constructed in accordance with my invention as applied to the frame and axle of a motor vehicle;

Figure 1:
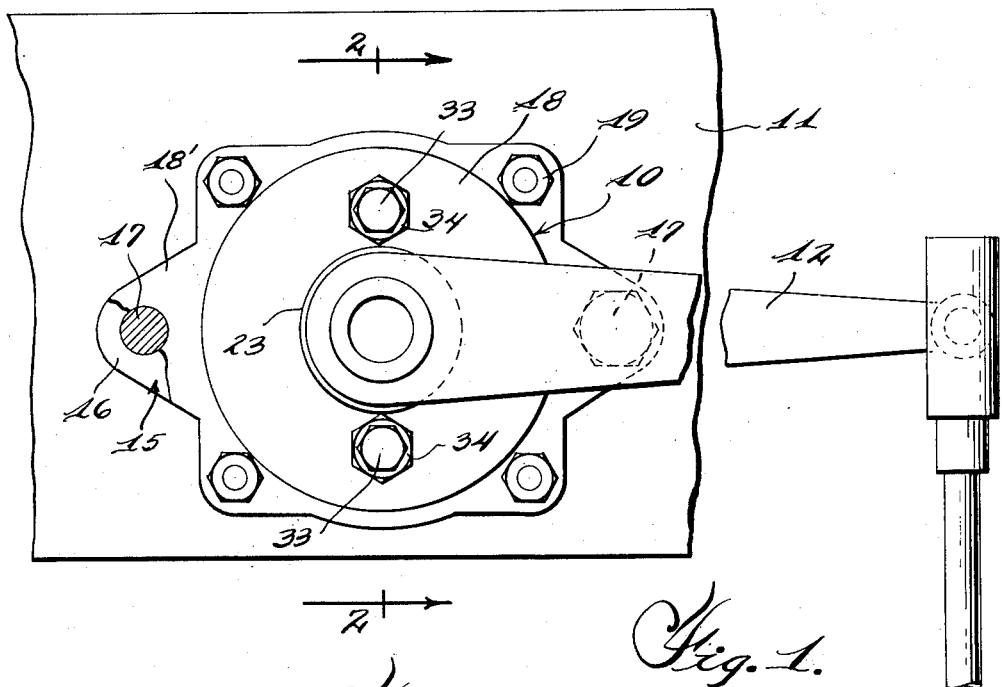

Referring now more particularly to the drawings wherein like reference characters indicate like parts, it will be noted that there is illustrated a housing or casing 10 adapted to be connected to one relatively movable part, such for instance as the frame 11 of the motor vehicle. The device further comprises an exterior arm 12 adapted to be connected by means of a rod 13 to the other relatively movable part, such as for instance the axle 14 of the motor vehicle.

The casing or housing 10 comprises a base portion 15 provided with ears 16 which are attached to the frame 11 by means of bolts 17. The other housing part 18 is of pan-shape cross-section and is secured to the base section 15 by means of bolts or rivets 19, a gasket or the like 20 being interposed between the parts to provide a fluid tight joint therebetween. The housing part 18 may also be provided with ears 18' similar to the ears 16, the bolts 17 passing through both sets of ears.

Rotatably mounted in the axial center of the housing 10 is a shaft 21. One end of this shaft is journaled in a tubular extension or boss 22 formed in the base section 15 and the other end of the shaft is journaled in a boss or extension 23, a bushing 24 being interposed between the shaft 21 and the extension 23. The end of this shaft 21 which extends beyond the casing has attached thereto the arm 12.

The outer open end of the boss 22 is sealed by a cap or closure 50 and a packing gland 51 is provided at the point where the shaft 21 extends outside the housing, this gland being held in place by means of a cap member 52. These elements make the housing or casing fluid tight at these points.

Arranged within the housing are a plurality of friction inducing instrumentalities in the form of disks. Alternate ones of the disks, such for instance as disks 25, are splined or keyed to shaft 21 as indicated at 26 whereas the other series of alternate disks 27 are splined to the housing by means of ribs 28 engaging recesses in the periphery of these disks. These alternate disks are fixed to rotate with the shaft 21 whereas the other alternate disks do not rotate for the reason that they are fixed to the housing section 18. Thus, upon relative movement between the vehicle parts 11 and 14, the series of disks 25 and 27 will frictionally engage one another to set up a resistance to the movement of these two vehicle parts. The disks of each of the sets of disks 25 and 27 are so connected respectively to the shaft 21 and the housing whereby to permit axial movement of these disks to bring them into frictional engagement with one another as the pressure against the disks varies.

Figure 2:
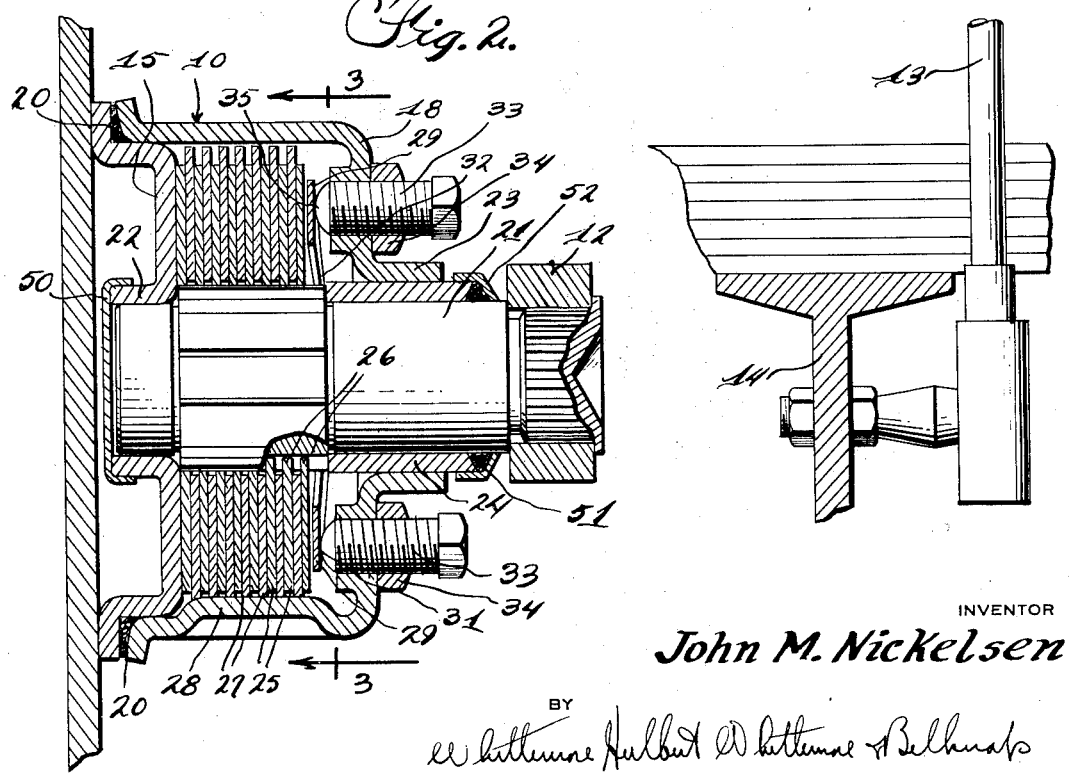
Figure 2 is an enlarged sectional view through the device.
Figure 3:
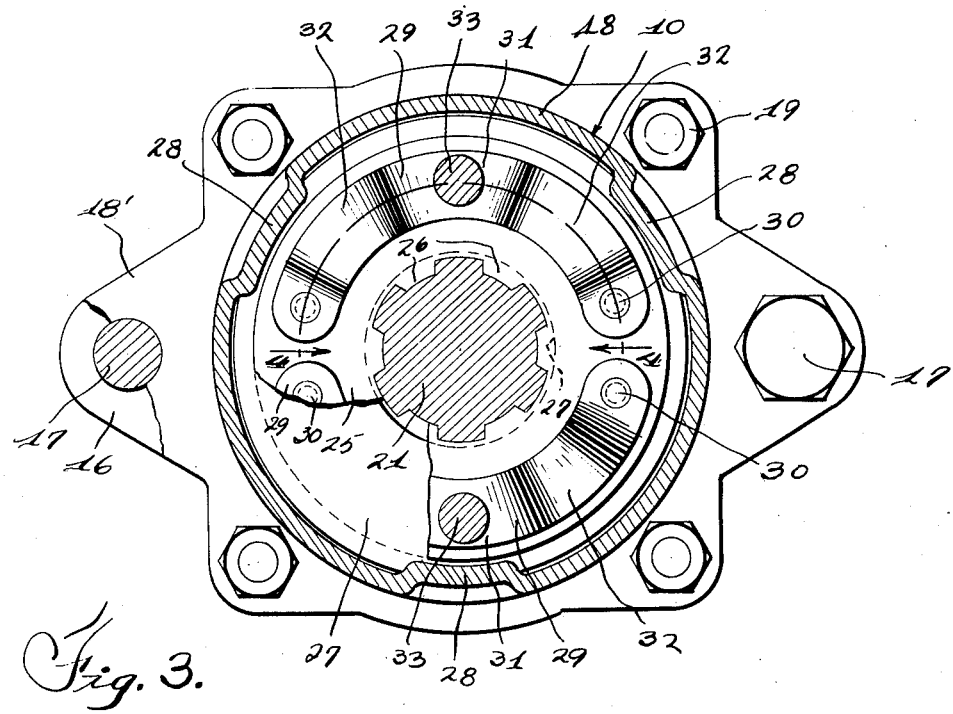
Figure 3 is a sectional view taken substantially on the plane indicated by line 3—3 of Figure 2.
Figure 4:
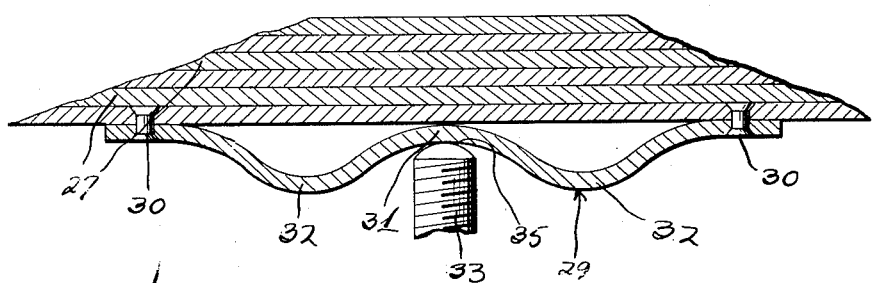
Figure 4 is a sectional view taken substantially on the plane indicated by line 4—4 of Figure 3.

In order to provide for variable resistance which, as heretofore pointed out, becomes increasingly greater towards the ends of the movement of the arm 12 in either direction, I provide a pair of serpentine-like spring members 29 fixed as at 30 to the outermost disk, that is, the disk arranged at the extreme right hand side in Figure 2. Each of these resilient or spring members 29 is provided with a centrally arranged low part 31 and a pair of high parts 32 functioning as cams. Cooperating with each resilient member 29 is an adjusting member in the form of a set screw 33 threaded through the housing section 18, a lock-nut 34 being provided for securing the adjusting member 33 in any of its adjusted positions. The nose 35 of each adjusting member 33 is adapted to engage the surface of the serpentine resilient member 31 and while this adjusting member is normally disposed opposite the low point 31 of its corresponding resilient member, rotary movement of the shaft 21 moves the disks 25 and consequently the spring member so that the nose 35 is brought into engagement with either one of the high points 32 on the resilient member. Obviously, such movement acts to progressively increase the pressure exerted by the spring members on the disks 25 and 27 so as to increase the friction therebetween.

The members 29 are in the nature of spring cams, the camming action increasing as the high or cam parts 32 of the spring are brought under the set screws 33. The arrangement of the parts is such that the spring 29 always exerts a slight pressure on the disks and upon slight movement of the disks in either direction very little additional pressure is exerted by the spring so that the desirable free center is obtained. The resiliency of this spring will automatically take up and compensate for any wear occasioned to the disks 25 and 27 or set screws 33.

Obviously, by adjusting the set screw 33 the amount of resistance may be regulated. Normally the position of the low part 31 with respect to the adjusting member 33 is such that but little resistance is imposed to the relative movements of the vehicle parts when these movements are slight as, for instance, when the vehicle is traveling over a smooth surface. This provides for the desirable so-called "free center". Moreover, when the relative movement between the vehicle parts increases slightly, the resistance while becoming increasingly effective, is relatively small. However, when the relative movements between the vehicle parts become large the high parts 32 of the spring are moved under the adjusting members 33 so as to exert a greater resistance to thus effectively check these undesirable large body movements.

As has been heretofore pointed out, the housing 10 is fluid proof and it is proposed to introduce thereinto oil or grease, the disks thereby working in the presence of this lubricant to provide for a lubricated friction action between the parts.

The regulation of the amount of resistance may be quickly altered from the exterior of the device by properly adjusting the members 33 and as a consequence the device may be adjusted easily for vehicles of different weight.

Obvious modifications may suggest themselves to those skilled in this art and to this end reservation is made to make such changes as may come within the purview of the accompanying claims.

What I claim as my invention is:

1. In a shock absorber of the class described, a casing, a rotatable shaft mounted therein, series of relatively movable friction disks, one of said series being non-rotatably connected to said casing, the other series being fixed to rotate with said shaft, and means for automatically increasing the frictional pressure between said disks proportionately to the rotative movement of said shaft, said means comprising an inherently resilient cam member and a member bearing against said cam member and movable relative thereto, for the purpose set forth.

2. In a shock absorber of the class described, a casing, a rotatable shaft mounted therein, series of relatively movable friction disks, one of said series being non-rotatably connected to said casing, the other series being fixed to rotate with said shaft, and a resilient member constituting a cam member movable with said shaft and cooperating with a member on said casing for varying the frictional pressure between said disks proportionately to the rotative movement of said shaft.

3. In a shock absorber of the class described, a casing, a rotatable shaft mounted therein, series of relatively movable friction disks, one of said series being non-rotatably connected to said casing, the other series being fixed to rotate with said shaft, and a spring member provided with a cam surface movable with said shaft and cooperating with a member on said casing for varying the frictional pressure between said disks proportionately to the rotative movement of said shaft, and means for adjusting said member to regulate said frictional pressure.

4. In a shock absorber of the class described, a casing, a rotatable shaft mounted therein, series of relatively movable friction disks, one of said series being non-rotatably connected to said casing, the other series being fixed to rotate with said shaft, a spring member for pressing said disks together, spaced cam surfaces on said spring member, and a member on said casing engaging said spring and the cam surfaces thereof to progressively increase the pressure on said disks as said shaft moves in either direction.

5. In a shock absorber of the class described, a casing, a rotatable shaft mounted therein, series of relatively movable friction disks, one of said series being non-rotatably connected to said casing, the other series being fixed to rotate with said shaft, a spring member for pressing said disks together, said spring member having an intermediate low portion and high portions on opposite sides thereof, and a member carried by said casing normally engaging the low portion of said spring member and engaging one of the high portions thereof upon rotation of said shaft in either direction whereby to progressively increase the pressure exerted on said disks.

6. In a shock absorber of the class described, a casing, a rotatable shaft mounted therein, series of relatively movable friction disks, one of said series being non-rotatably connected to said casing, the other series being fixed to rotate with said shaft, a spring member for pressing said disks together, said spring member having an intermediate low portion and high portions on opposite sides thereof, and a member carried by said casing normally engaging the low portion of said spring member and engaging one of the high portions thereof upon rotation of said shaft in either direction whereby to progressively increase the pressure exerted on said disks, said last member comprising an adjustable set screw.

J. M. NICKELSEN.